(12) United States Patent
Wu

(10) Patent No.: US 12,249,249 B1
(45) Date of Patent: Mar. 11, 2025

(54) VIRTUAL AND REAL INTEGRATED MEDICAL TEACHING ASSISTANCE SYSTEM BASED ON MIXED REALITY AND METHOD THEREOF

(71) Applicant: TAIPEI MEDICAL UNIVERSITY, Taipei (TW)

(72) Inventor: Jen-Chieh Wu, Taipei (TW)

(73) Assignee: TAIPEI MEDICAL UNIVERSITY, Taipei (TW)

( * ) Notice: Subject to any disclaimer, the term of this patent is extended or adjusted under 35 U.S.C. 154(b) by 0 days.

(21) Appl. No.: 18/427,663

(22) Filed: Jan. 30, 2024

(30) Foreign Application Priority Data

Oct. 30, 2023 (TW) ................... 112141625

(51) Int. Cl.
| | |
|---|---|
| *G09B 23/28* | (2006.01) |
| *G06F 3/01* | (2006.01) |
| *G06T 7/20* | (2017.01) |
| *G06T 19/00* | (2011.01) |
| *G09B 5/06* | (2006.01) |
| *G06V 40/20* | (2022.01) |

(52) U.S. Cl.
CPC .......... *G09B 23/28* (2013.01); *G06F 3/017* (2013.01); *G06T 7/20* (2013.01); *G06T 19/006* (2013.01); *G09B 5/06* (2013.01); *G06T 2207/30004* (2013.01); *G06T 2207/30196* (2013.01); *G06T 2210/41* (2013.01); *G06V 40/20* (2022.01)

(58) Field of Classification Search
CPC ........... G09B 23/28; G09B 5/06; G06F 3/017; G06T 7/20; G06T 19/00; G06T 19/006; G06T 2207/30004; G06T 2207/30196; G06T 2210/41; G06V 40/20
See application file for complete search history.

(56) References Cited

U.S. PATENT DOCUMENTS

| 2022/0270509 A1* | 8/2022 | Josephson | ............ G09B 19/003 |
| 2023/0363821 A1* | 11/2023 | Levin | ...................... G09B 23/28 |
| 2023/0386155 A1* | 11/2023 | Aharonson | .............. G09B 5/06 |

* cited by examiner

*Primary Examiner* — Timothy A Musselman
(74) *Attorney, Agent, or Firm* — Chih Feng Yeh; Yongjean Consulting Inc.

(57) ABSTRACT

A virtual and real integrated medical teaching assistance system based on mixed reality and a method thereof are disclosed. A virtualization computing device corrects and positions a virtual posture model to a predefined position on the physical environment image, recognizes an operation gesture from the physical environment image to trigger a teaching function to obtain medical-teaching guidance information from a teaching device; a virtual-and-real display device displays virtual-and-real integration of each teaching step of the medical-teaching guidance information, the virtualization computing device recognizes a hand position and detects a hand motion on the hand position on the physical environment image based on posture model positioning points, to provide human body information and hand motion information to the teaching device, the teaching device determines motion correctness and score of the human body information and the hand motion information corresponding to a teaching step of the medical-teaching guidance information.

9 Claims, 12 Drawing Sheets

```
                                                     ┌─ 901
┌─────────────────────────────────────────────────┐ │
│ Obtaining and providing a physical environment  │ │
│ image of a physical space, by a camera device,  │ │
│ wherein the physical environment image          │ │
│ comprises a teach doll, and the teach doll has  │ │
│ a sensor disposed at a particular position.     │ │
└─────────────────────────────────────────────────┘
                         │
                         ▼
                                                     ┌─ 902
┌─────────────────────────────────────────────────┐ │
│ Generating and providing the medical-teaching   │ │
│ virtual interface to a virtual-and-real display │ │
│ device, by a teaching device, wherein the       │ │
│ virtual-and-real display device is coupled to   │ │
│ the teaching device.                            │ │
└─────────────────────────────────────────────────┘
                         │
                         ▼
                                                     ┌─ 903
┌─────────────────────────────────────────────────┐ │
│ Coupling a virtualization computing device to   │ │
│ the virtual-and-real display device, to display │ │
│ virtual-and-real integration of the virtual     │ │
│ posture model, the medical-teaching virtual     │ │
│ interface, the teach doll and the physical      │ │
│ space.                                          │ │
└─────────────────────────────────────────────────┘
                         │
                         ▼
                                                     ┌─ 904
┌─────────────────────────────────────────────────┐ │
│ Correcting and positioning a virtual posture    │ │
│ model to a position of the teach doll in the    │ │
│ physical environment image, by the              │ │
│ virtualization computing device, and display a  │ │
│ change in adjustment of the virtual posture     │ │
│ model in real time, by the virtual-and-real     │ │
│ display device.                                 │ │
└─────────────────────────────────────────────────┘
                         │
                         └──────────────────►( A )
```

FIG. 8A

VIRTUAL AND REAL INTEGRATED MEDICAL TEACHING ASSISTANCE SYSTEM BASED ON MIXED REALITY AND METHOD THEREOF

CROSS-REFERENCE STATEMENT

The present application is based on, and claims priority from, TAIWAN Patent Application Serial Number 112141625, filed Oct. 30, 2023, the disclosure of which is hereby incorporated by reference herein in its entirety.

BACKGROUND

1. Technical Field

The present invention is related to a teaching assistance system and a method thereof, more particularly to a virtual and real integrated medical teaching assistance system based on mixed reality and a method thereof.

2. Related Art

Some subjects (such as medical subjects) need to use physical objects (such as Annie teaching dolls) to assist teaching and learning operations. However, providing a large number of physical objects to assist teaching causes a significant increase in teaching costs, so only a small amount of physical objects can be provided to assist teaching subject to teaching cost considerations.

However, when the teaching time is constant, a small amount of physical objects for assisting teaching cannot satisfy every student to actually perform learning operations, and it undoubtedly also affects the quality of teaching and the learning effect of student. Therefore, an improved solution is required for this situation.

According to above-mentioned contents, what is needed is to develop an improved solution to solve the conventional problem of bad learning effect due to failure to provide enough physical objects for assisting teaching subject to teaching cost considerations.

SUMMARY OF THE INVENTION

An objective of the present is to disclose a virtual and real integrated medical teaching assistance system based on mixed reality and a method thereof, to solve the conventional problem of bad learning effect due to failure to provide enough physical objects for assisting teaching subject to teaching cost considerations.

In order to achieve the objective, the present invention provide a first embodiment of a virtual and real integrated medical teaching assistance system based on mixed reality, and the virtual and real integrated medical teaching assistance system includes a camera device, a virtualization computing device, a teaching device and a virtual-and-real display device. The virtualization computing device includes a first non-transitory computer-readable storage medium and a first hardware processor, the teaching device includes a second non-transitory computer-readable storage medium and a second hardware processor.

The camera device is configured to obtain and provides a physical environment image of a physical space. The virtualization computing device is coupled to the camera device. The first non-transitory computer-readable storage medium is configured to store first computer readable instructions. The first hardware processor is electrically connected to the first non-transitory computer-readable storage medium, and configured to execute the first computer readable instructions to make the virtualization computing device execute: receiving the physical environment image from the camera device, and correcting and positioning a virtual posture model to a predefined position on the physical environment image; performing gesture recognition on the physical environment image to obtain an operation gesture, and when a medical teaching function on a medical-teaching virtual interface is determined to be triggered, providing a trigger instruction corresponding to the medical teaching function; receiving medical-teaching guidance information or a step instruction to select one of teaching steps of the medical-teaching guidance information; recognizing a hand position and detecting a hand motion on the hand position on the physical environment image based on the posture model positioning points, to generate human body information and hand motion information corresponding to the selected one of the teaching steps of the medical-teaching guidance information. The teaching device is coupled to the virtualization computing device. The second non-transitory computer-readable storage medium is configured to store second computer readable instructions. The second hardware processor is electrically connected to the second non-transitory computer-readable storage medium, and configured to execute the second computer readable instructions to make the teaching device execute: generating and providing the medical-teaching virtual interface; receiving the trigger instruction from the virtualization computing device, and providing the medical-teaching guidance information corresponding to the trigger instruction; receiving the human body information and the hand motion information from the virtualization computing device, determining motion correctness and a score of the human body information and the hand motion information corresponding to the selected one of the teaching steps of the medical-teaching guidance information, to generate the step instruction. The virtual-and-real display device is coupled to the virtualization computing device and the teaching device, and configured to display virtual-and-real integration of the posture model positioning points, the virtual posture model, the medical-teaching virtual interface, and the physical space, display a change in adjustment of the virtual posture model in real time, display virtual-and-real integration of the physical space and the teaching steps of the medical-teaching guidance information in sequential order, and display virtual-and-real integration of the physical space, each of the teaching steps of the medical-teaching guidance information and the motion correctness and the score thereof.

In order to achieve the objective, the present invention provide a first embodiment of a virtual and real integrated medical teaching assistance method based on mixed reality, and the virtual and real integrated medical teaching assistance method includes steps of: obtaining and providing a physical environment image of a physical space to a virtualization computing device, by a camera device, wherein the virtualization computing device is coupled to the camera device; generating and providing a medical-teaching virtual interface to a virtual-and-real display device, by a teaching device, wherein the virtual-and-real display device is coupled to the teaching device; displaying virtual-and-real integration of a virtual posture model, the medical-teaching virtual interface and the physical space, by the virtualization computing device and the virtual-and-real display device, wherein the virtualization computing device is coupled to the virtual-and-real display device; correcting and positioning the virtual posture model to a predefined position on the physical environment image, by the virtualization computing device, and displaying the adjusted virtual posture model in real time, by the virtual-and-real display device; performing gesture recognition on the physical environment image to obtain an operation gesture, and when a medical teaching function on a medical-teaching virtual interface is determined to be triggered, providing a trigger instruction corresponding to the medical teaching function to the teaching device, by the virtualization computing device; providing the corresponding medical-teaching guidance information to the virtualization computing device and the virtual-and-real display device, by the teaching device, wherein the virtual-and-real display device displays virtual-and-real integration of the physical space and the teaching steps of the medical-teaching guidance information in sequential order; selecting one of the teaching steps of the medical-teaching guidance information based on the step instruction, by the virtualization computing device; recognizing a hand position and detecting a hand motion on the hand position in the physical environment image based on the posture model positioning point, to generate human body information, hand motion information, and one of the teaching step corresponding to the medical-teaching guidance information, by the virtualization computing device; receiving the human body information and the hand motion information from the virtualization computing device, determining motion correctness and a score of the human body information and the hand motion information corresponding to the selected one of the teaching steps of the medical-teaching guidance information, and generating the step instruction, by the teaching device; displaying virtual-and-real integration of the physical space, and each of the teaching steps of the medical-teaching guidance information and the motion correctness and the score thereof.

In order to achieve the objective, the present invention discloses a second embodiment of a virtual and real integrated medical teaching assistance system based on mixed reality, and the virtual and real integrated medical teaching assistance system includes a camera device, a virtualization computing device, a teaching device and a virtual-and-real display device. The virtualization computing device includes a first non-transitory computer-readable storage medium and a first hardware processor, and the teaching device includes a second non-transitory computer-readable storage medium and a second hardware processor.

The camera device is configured to obtain and provide a physical environment image of a physical space, wherein the physical environment image comprises a teach doll, and the teach doll comprises a sensor disposed at a particular position. The virtualization computing device is coupled to the camera device and the teach doll. The first non-transitory computer-readable storage medium is configured to store first computer readable instructions. The first hardware processor is electrically connected to the first non-transitory computer-readable storage medium, and configured to execute the first computer readable instructions to make the virtualization computing device execute: receiving the physical environment image from the camera device, and correcting and positioning a virtual posture model to a position of the teach doll in the physical environment image; performing gesture recognition on the physical environment image to obtain an operation gesture, and when a medical teaching function on a medical-teaching virtual interface is determined to be triggered, providing a trigger instruction corresponding to the medical teaching function; receiving medical-teaching guidance information or a step instruction to select one of the teaching steps of the medical-teaching guidance information; obtaining a sensing signal corresponding to the sensor from the teach doll, to recognize human body information, hand motion information and one of the teaching steps of the medical-teaching guidance information based on the sensing signal. The teaching device is coupled to the virtualization computing device. The second non-transitory computer-readable storage medium, configured to store second computer readable instructions. The second hardware processor is electrically connected to the second non-transitory computer-readable storage medium, and configured to execute the second computer readable instructions to make the teaching device execute: generating and providing the medical-teaching virtual interface; receiving the trigger instruction from the virtualization computing device to provide the medical-teaching guidance information corresponding to the trigger instruction; receiving the human body information and the hand motion information from the virtualization computing device, determining motion correctness and a score of the human body information and the hand motion information corresponding to the one of the teaching steps of the medical-teaching guidance information, to generate the step instruction. The virtual-and-real display device is coupled to the virtualization computing device and the teaching device, and configured to display virtual-and-real integration of the posture model positioning points, the virtual posture model, the medical-teaching virtual interface, the teach doll and the physical space, display a change in adjustment of the virtual posture model in real time, display virtual-and-real integration of the physical space and the teaching steps of the medical-teaching guidance information in sequential order, and display virtual-and-real integration of the physical space, and each of the teaching steps of the medical-teaching guidance information and the motion correctness and score thereof.

In order to achieve the objective, the present invention discloses a second embodiment of a virtual and real integrated medical teaching assistance method based on mixed reality, and the method includes steps of: obtaining and providing a physical environment image of a physical space to a virtualization computing device, by a camera device, wherein the virtualization computing device is coupled to the camera device, the physical environment image includes a teach doll, the teach doll has a sensor disposed at a particular position; generating and providing a medical-teaching virtual interface to a virtual-and-real display device, by a teaching device, wherein the virtual-and-real display device is coupled to the teaching device; coupling the virtualization computing device to a virtual-and-real display device to display virtual-and-real integration of the virtual posture model, the medical-teaching virtual interface, the teach doll and the physical space; correcting and positioning the virtual posture model to a position of the teach doll in the physical environment image, by the virtualization computing device, and displaying the adjusted virtual posture model in real time, by the virtual-and-real display device; performing gesture recognition on the physical environment image to obtain an operation gesture, when a medical teaching function on a medical-teaching virtual interface is determined to be triggered, providing a trigger instruction corresponding to the medical teaching function to the teaching device, by the virtualization computing device; providing the corresponding medical-teaching guidance information to the virtualization computing device and the virtual-and-real display device, by the teaching device, displaying virtual-and-real integration of the physical space and each of teaching steps of the medical-teaching guidance information in sequential order, by the virtual-and-real display device; selecting one of the teaching steps of the medical-teaching guidance information based on the step instruction, by the virtualization computing device; obtaining a sensing signal corresponding to the sensor from the teach doll, recognizing the human body information and the hand motion information based on the sensing signal and corresponding to the selected one of the teaching steps of the medical-teaching guidance information, by the virtualization computing device; receiving the human body information and the hand motion information from the virtualization computing device, determining motion correctness and a score of the human body information and the hand motion information corresponding to the selected one of the teaching steps of the medical-teaching guidance information, to generate the step instruction, by the teaching device; displaying virtual-and-real integration of the physical space and each of the teaching steps of the medical-teaching guidance information and the motion correctness and the score thereof, by the virtual-and-real display device.

According to the above-mentioned systems and methods of the present invention, the virtualization computing device corrects and positions the virtual posture model to the predefined position on the physical environment image, recognizes an operation gesture from the physical environment image to trigger the medical teaching function to obtain the medical-teaching guidance information from the teaching device, the virtual-and-real display device displays virtual-and-real integration of each of the teaching steps of the medical-teaching guidance information, the virtualization computing device recognizes the hand position and detects the hand motion on the hand position on the physical environment image based on posture model positioning points, to generate and provide the human body information and the hand motion information to the teaching device, the teaching device determines the motion correctness and the score of the human body information and the hand motion information corresponding to the teaching step of the medical-teaching guidance information.

Therefore, the above-mentioned technical solution of the present invention is able to achieve the technical effect of providing virtual and real integrated medical teaching assistance based on mixed reality.

BRIEF DESCRIPTION OF THE DRAWINGS

The structure, operating principle and effects of the present invention will be described in detail by way of various embodiments which are illustrated in the accompanying drawings.

FIG. 8A to FIG. 8C are flowcharts of a second embodiment of a virtual and real integrated medical teaching assistance method based on mixed reality, according to the present invention.

DETAILED DESCRIPTION OF THE PREFERRED EMBODIMENTS

Figure 1:
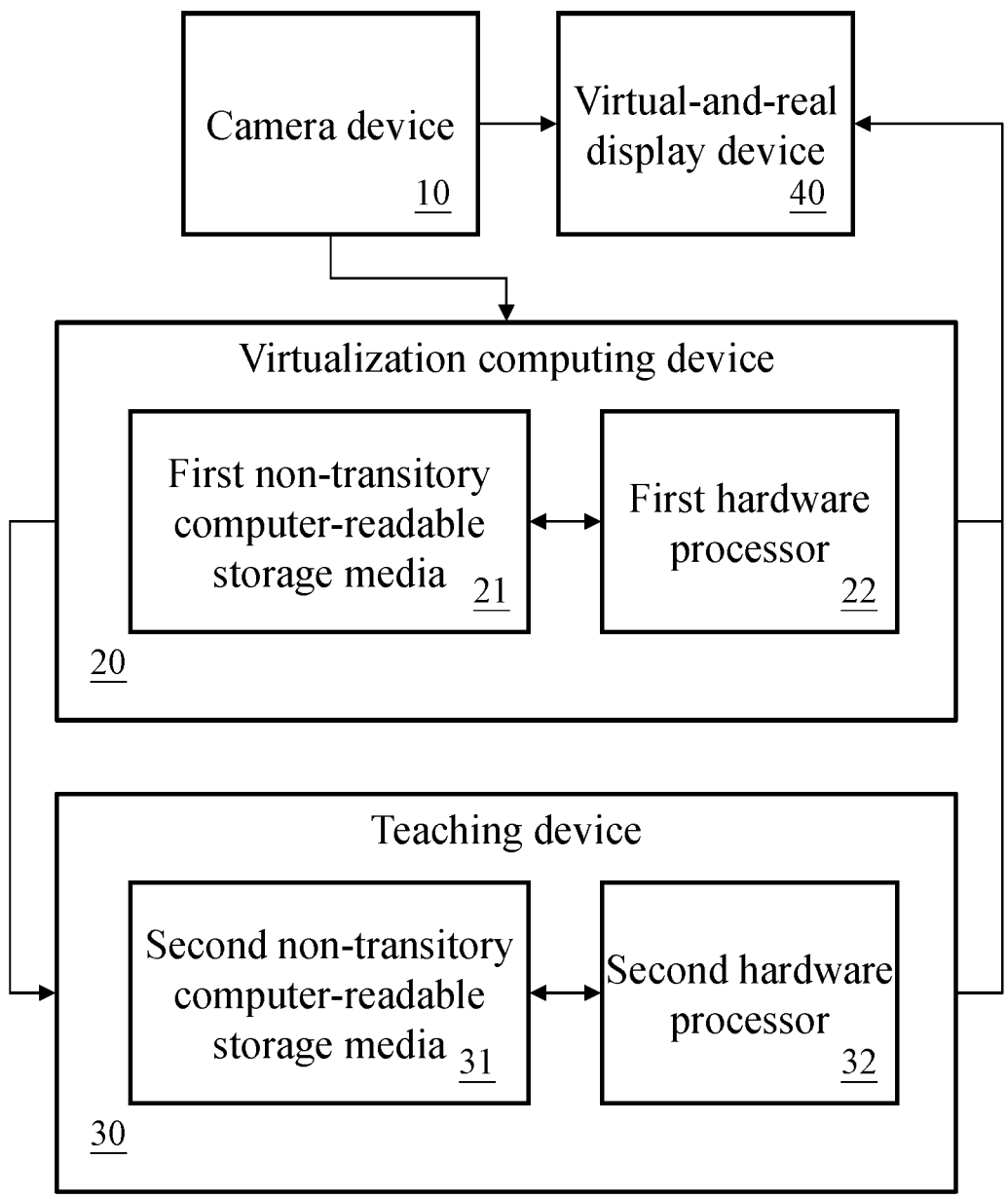
FIG. 1 is a system block diagram of a first embodiment mode of a virtual and real integrated medical teaching assistance system based on mixed reality, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to"

or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The first embodiment of the virtual and real integrated medical teaching assistance system based on mixed reality according to the present invention will be illustrated in the following paragraphs, and the system is particularly provided for medical teaching. Please refer to FIG. 1. FIG. 1 is a system block diagram of a first embodiment mode of a virtual and real integrated medical teaching assistance system based on mixed reality, according to the present invention.

The virtual and real integrated medical teaching assistance system includes a camera device 10, a virtualization computing device 20, a teaching device 30 and a virtual-and-real display device 40. The virtualization computing device 20 includes a first non-transitory computer-readable storage medium 21 and a first hardware processor 22, and the teaching device 30 includes a second non-transitory computer-readable storage medium 31 and a second hardware processor 32.

The camera device 10 is configured to obtain and provide a physical environment image of a physical space. The virtualization computing device 20 is coupled to the camera device by a wired transmission manner or a wireless transmission manner, the wired transmission manner can be, for example, a power line network, an optical network, and so on; the wireless transmission manner can be, for example, Wi-Fi, a mobile communication network (such as 4G, or 5G); however, these examples are merely for exemplary illustration, and the application field of the present invention is not limited to these examples.

The first non-transitory computer-readable storage medium 21 of the virtualization computing device 20 is configured to store first computer readable instructions. The first hardware processor 22 is electrically connected to the first non-transitory computer-readable storage medium 21, and configured to execute the first computer readable instructions to make the virtualization computing device execute the following operations: receiving the physical environment image from the camera device 10, and correcting and positioning a virtual posture model 50 to a predefined position on the physical environment image; performing gesture recognition on the physical environment image to obtain an operation gesture, and when a medical teaching function on a medical-teaching virtual interface is determined to be triggered, providing a trigger instruction corresponding to the medical teaching function; receiving medical-teaching guidance information or a step instruction to select one of teaching steps of the medical-teaching guidance information; recognizing a hand position and detecting a hand motion on the hand position on the physical environment image based on the posture model positioning points, to generate human body information and hand motion information corresponding to the selected one of the teaching steps of the medical-teaching guidance information.

The teaching device 30 is coupled to the virtualization computing device 20. The second non-transitory computer-readable storage medium 31 is configured to store second computer readable instructions; the second hardware processor 32 is electrically connected to the second non-transitory computer-readable storage medium 31, and configured to execute the second computer readable instructions to make the teaching device 30 execute: generating and providing the medical-teaching virtual interface. receiving the trigger instruction from the virtualization computing device, and providing the medical-teaching guidance information corresponding to the trigger instruction; receiving the human body information and the hand motion information from the virtualization computing device, determining motion correctness and a score of the human body information and the hand motion information, and the selected one of the teaching steps of the medical-teaching guidance information, to generate the step instruction.

Figure 2:
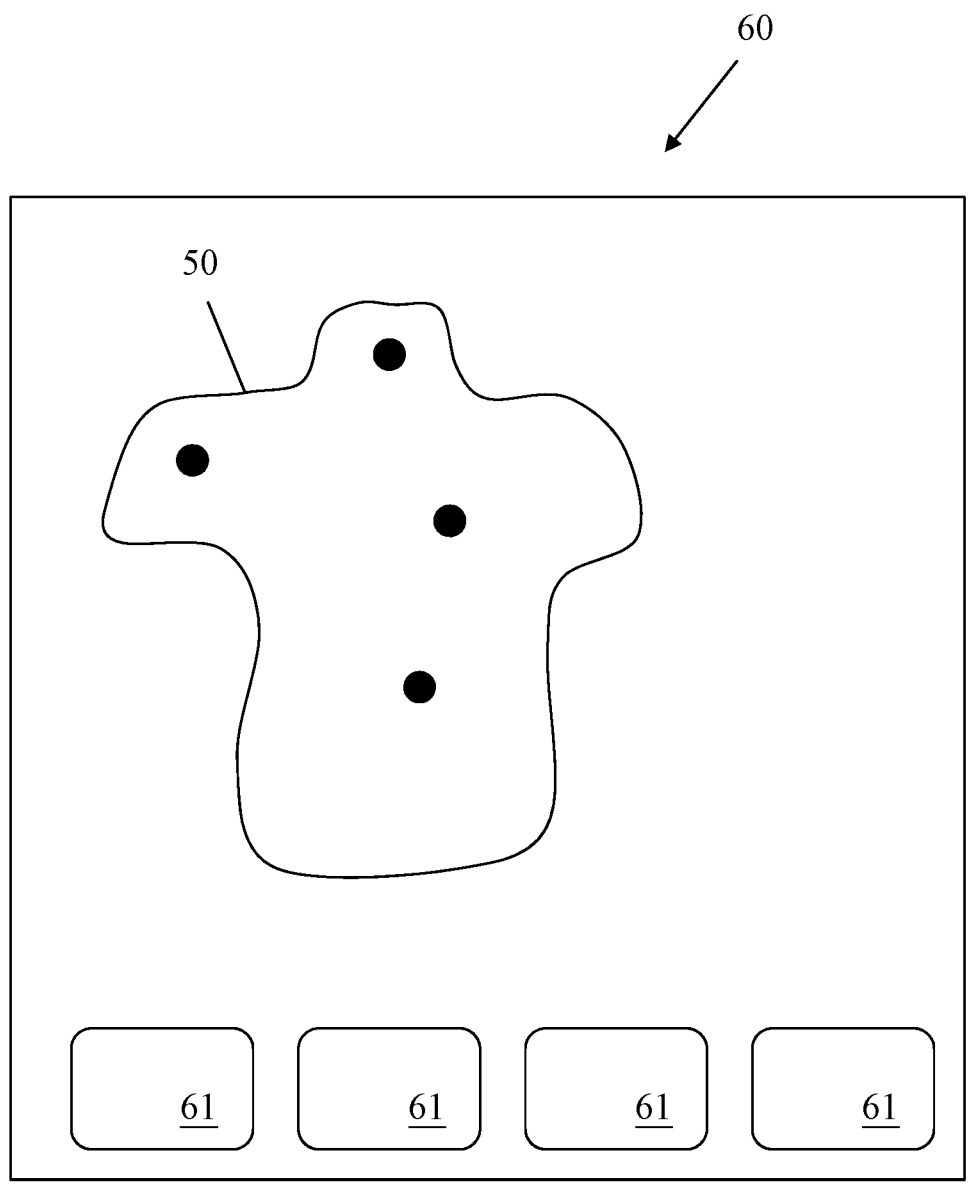
FIG. 2 is a schematic view of virtual-and-real integration of the first embodiment of a virtual and real integrated medical teaching assistance system based on mixed reality, according to the present invention.

The virtual-and-real display device 40 is coupled to a virtualization computing device 20 and a teaching device 30, the teaching device 30 generates and provides a medical-teaching virtual interface 60 to the virtual-and-real display device 40, and the virtual-and-real display device 40 displays virtual-and-real integration of the posture model positioning points, the virtual posture model, the medical-teaching virtual interface and the physical space. Please refer to FIG. 2. FIG. 2 schematically shows the virtual-and-real integration of the virtual-and-real display device 40 of the first embodiment, according to the present invention.

The virtualization computing device 20 receives the physical environment image from the camera device 10, corrects and positions a virtual posture model 50 to a predefined position of the physical environment image, the virtualization computing device 20 sets multiple posture model positioning points in the physical environment image, and the virtualization computing device 20 generates the virtual posture model 50 having posture model aligning points based on a preset size.

The virtual-and-real display device 40 is configured to display virtual-and-real integration of the posture model positioning points, the virtual posture model 50, and the physical space. The virtual-and-real display device 40 can adopt the naked vision 3D technology to display virtual-and-real integration of the posture model positioning points, the virtual posture model 50 and the physical space. In an embodiment, the virtual-and-real display device 40 can adopt a mixed reality device, which has transparent waveguides to couple light input grating and/or output grating, to display virtual-and-real integration of the posture model positioning points, the virtual posture model 50 and the physical space. However, these examples are merely for exemplary illustration, and the application field of the present invention is not limited to these examples.

When an operator operates the virtual posture model 50 by a gesture thereof, the physical environment image obtained and provided by the camera device 10 includes an operating gesture, the virtualization computing device 20 performs gesture recognition on the physical environment image to obtain an adjustment gesture for scaling, moving, or 3D rotating the virtual posture model 50. The above-mentioned gesture recognition is performed through a gesture model trained with machine learning to recognize a gesture operation. The gesture model can be, for example, a 3D model, skeleton model, or an appearance model. The machine learning can be, for example, Adaboost, decision tree, hidden Markov model (HMM), support vector machine (SVM), dynamic time warping, or artificial neural network. However, these examples are merely for exemplary illustration, and the application field of the present invention is not limited to these examples. The virtual posture model 50 adjusted by the scaling, moving, or 3D rotating operation is displayed by the virtual-and-real display device 40 in real time.

The operator uses the adjustment gesture to scale, move, or 3D rotate the virtual posture model 50, to make the posture model aligning points of the virtual posture model 50 correspond and align to the posture model positioning points one by one. The virtualization computing device 20 performs gesture recognition on the physical environment image to obtain a position-fixing gesture for fixing the virtual posture model 50. It should be noted that the posture model aligning points of the virtual posture model 50 and the posture model positioning points correspond to each other one by one, so that the virtual posture model 50 can present a posture of a human body lying on its back, a posture of a human body lying on its side, or a posture of a human body lying prone. However, these examples are merely for exemplary illustration, and the application field of the present invention is not limited to these examples.

It should be noted that the adjustment gesture can be a two-hand gesture (such as a rotating action of both hands, an expanding or retracting action of both hand), a one-hand gesture (such as a moving or rotating action of one hand); the position-fixing gesture can include a gesture with one hand (such as a clicking action of one hand to click and select a posture model positioning point or a posture model aligning point). However, these examples are merely for exemplary illustration, and the application field of the present invention is not limited to these examples.

The virtualization computing device 20 corresponds the posture model aligning points of the virtual posture model 50 to the posture model positioning points one by one, the virtualization computing device 20 automatically corrects to calculate an adjustment instruction for scaling, moving, or 3D rotating the virtual posture model 40, to automatically correct and align the virtual posture model 50 to the positions of the posture model positioning points.

The virtualization computing device 20 performs gesture recognition on the physical environment image to obtain an operation gesture. When determining that a medical teaching function on a medical-teaching virtual interface 60 is triggered, the virtualization computing device 20 provides a trigger instruction corresponding to the medical teaching function to the teaching device 30. It should be noted that the virtualization computing device 20 recognizes a hand position in the physical environment image and the recognized hand position is used as a function position 61 on the medical-teaching virtual interface 60, and when the operation gesture is a single-hand gesture for clicking the function position 61, the virtualization computing device 20 determines that the medical teaching function corresponding to the function position 61 on the medical-teaching virtual interface is triggered, so that the virtualization computing device 20 provides the trigger instruction corresponding to the medical teaching function to the teaching device 30.

Figure 3A:
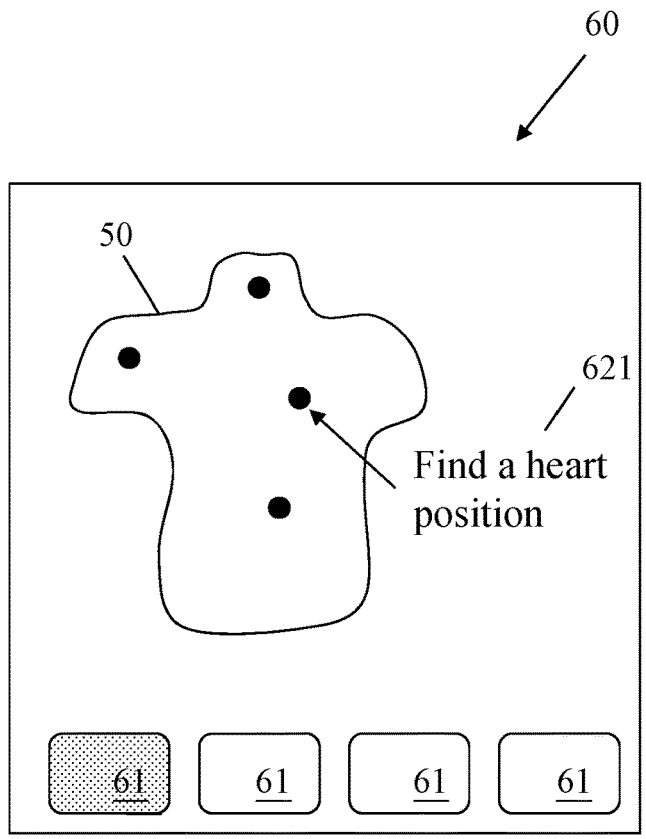
FIG. 3A is a schematic view of medical-teaching guidance information of the first embodiment of a virtual and real integrated medical teaching assistance system based on mixed reality, according to the present invention.

When the teaching device 30 receives the trigger instruction from the virtualization computing device 20, the teaching device 30 provides the medical-teaching guidance information corresponding to the trigger instruction, the virtual-and-real display device 40 displays virtual-and-real integration of the physical space, and each of teaching steps of the medical-teaching guidance information in sequential order. Please refer to FIG. 3A. FIG. 3A is a schematic view of a first teaching step 621 of the medical-teaching guidance information of the first embodiment, according to the present invention, but the present invention is not limited to above-mentioned examples.

When the virtualization computing device 20 receives the medical-teaching guidance information from the teaching device 30, the virtualization computing device 20 selects the first teaching step of the medical-teaching guidance information, the virtualization computing device 20 recognizes a hand position and detects a hand motion on the hand position on the physical environment image based on the posture model positioning points, to generate the human body information and the hand motion information corresponding to the teaching step of the medical-teaching guidance information. It should be noted that the human body information can be, for example, heart or tracheal, and the hand motion information can be, for example, press with both hands, thump with one hand, or slap with one hand, but these examples are merely for exemplary illustration, and the application field of the present invention is not limited to these examples.

The hand-motion detection of the virtualization computing device 20 is performed based on the hand motion model constructed by machine learning to recognize the hand motion; the hand motion model can refer to the previous illustration for the gesture model, so the detailed description is not repeated herein. The illustration of the machine learning can refer to the above-mentioned description, so the detailed description is not repeated herein.

The teaching device 30 receives the human body information and the hand motion information from the virtualization computing device 20, and determines motion correctness and a score of the human body information and the hand motion information corresponding to the selected one of the teaching step of the medical-teaching guidance information, to generate the step instruction. It should be noted that the step instruction generated by the teaching device 30 is the step instruction of the step next to the current teaching step of the medical-teaching guidance information, that is, when the current teaching step of the medical-teaching guidance information is the first teaching step, the step instruction generated by the teaching device 30 means "the second teaching step"; when the current teaching step corresponding to the medical-teaching guidance information is the second teaching step, the step instruction generated by the teaching device 30 means "the third teaching step"; when the current teaching step of the medical-teaching guidance information is the last teaching step, the teaching device 30 does not generate the step instruction. However, these examples are merely for exemplary illustration, and the application field of the present invention is not limited to these examples.

Particularly, in a condition that the current teaching step of the medical-teaching guidance information is "heart" and "vertical press with both hands", the human body information received by the teaching device 30 from the virtualization computing device 20 is "heart" and the hand motion information is "vertical press with both hands", the teaching device 30 can determine the correctness for the current teaching step of the medical-teaching guidance information to be "correct" and the score corresponding to the current teaching step to be "100". In a condition that the teaching step of the medical-teaching guidance information is "heart" and "vertical press with both hands", the human body information received by the teaching device 30 from the virtualization computing device 20 is "heart" and the hand motion information is "non-vertical press with both hands", the teaching device 30 can determine the correctness for the current teaching step of the medical-teaching guidance information to be "incorrect" and the score for the current teaching step to be "50". However, these examples are merely for exemplary illustration, and the application field of the present invention is not limited to these examples.

Figure 3B:
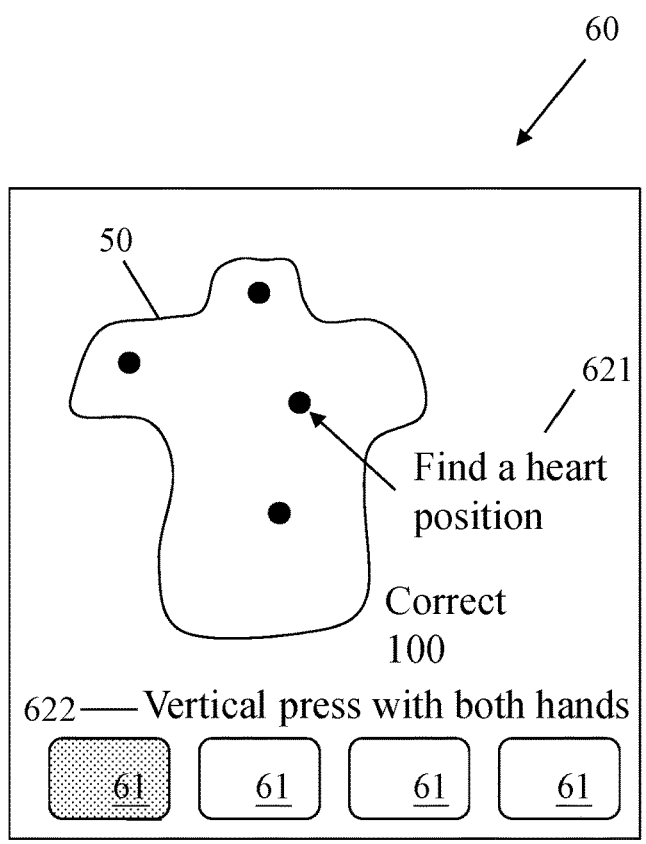
FIG. 3B is a schematic view of medical correctness and score of the first embodiment of a virtual and real integrated medical teaching assistance system based on mixed reality, according to the present invention.

The virtual-and-real display device 40 displays virtual-and-real integration of the physical space, and each of the teaching steps of the medical-teaching guidance information and motion correctness and score thereof. Please refer to FIG. 3B. FIG. 3B schematically shows motion correctness and scores corresponding to the second teaching step 622 of the medical-teaching guidance information and the first teaching step 621 of the medical-teaching guidance information. However, the present invention is not limited to above-mentioned examples. It should be noted that, after the teaching device 30 determines the motion correctness and the score corresponding to the teaching step of the medical-teaching guidance information based on the human body information and the hand motion information, the virtual-and-real integration of the physical space and the teaching step of the medical-teaching guidance information, and the motion correctness and the score thereof can be displayed. After the teaching device 30 completely determines the motion correctness and scores corresponding to all teaching steps of the medical-teaching guidance information, the virtual-and-real display device 40 displays virtual-and-real integration of the physical space, and each of the teaching steps of the medical-teaching guidance information and motion correctness and scores thereof in sequential order.

The virtualization computing device 20 generates a virtual operation equipment in the physical environment image, the virtual operation equipment has an equipment identification point, and the virtualization computing device 20 performs gesture recognition on the physical environment image to obtain an equipment selection gesture for operating the virtual operation equipment; the equipment selection gesture includes single-hand operation gesture (such as selecting the virtual operation equipment by one hand); however, these examples are merely for exemplary illustration, and the application field of the present invention is not limited to these examples. The virtualization computing device 20 performs position and motion recognition on the equipment identification point based on the posture model positioning points, to generate the operating position information and equipment motion information. For example, the virtualization computing device 20 can look up the equipment motion information corresponding to the equipment sensing signal through a lookup table. It should be noted that the equipment motion information can be, for example, cutting, pasting or inserting operation. However, these examples are merely for exemplary illustration, and the application field of the present invention is not limited to these examples. The teaching device 30 receives the human body information and the equipment motion information from the virtualization computing device 20, and determines the correctness and the score of the human body information and the equipment motion information corresponding to the teaching step of the medical-teaching guidance information. The virtual-and-real display device 40 displays a change in the operation of the virtual operation equipment in real time, and also displays virtual-and-real integration of the human body information, the equipment motion information, and the physical space.

The equipment motion recognition performed by the virtualization computing device 20 is based on an equipment motion model constructed by machine learning, to recognize the corresponding hand motion and equipment operation. The illustration of equipment motion model can refer to that of the gesture model, so the detailed description is not repeated herein. The illustration of the machine learning can refer to that of above-mentioned machine learning, so the detailed description is mot repeated herein.

A physical operation equipment can be disposed in the physical space; when the camera device 10 obtains and provides the physical environment image of the physical space, the physical environment image contains the physical operation equipment. The operation equipment includes an equipment identification point and an equipment sensor, the virtualization computing device 20 is coupled to the operation equipment through a wired transmission manner or a wireless transmission manner, the virtualization computing device 20 obtains an equipment sensing signal from an equipment sensor, and the virtualization computing device 20 recognizes a position of the equipment identification point based on the posture model positioning points, and recognizes equipment motion information based on the equipment sensing signal. The virtualization computing device 20 looks up the equipment motion information corresponding to the equipment sensing signal from a lookup table. The teaching device 30 receives the human body information and the equipment motion information from the virtualization computing device 20, and determines motion correctness and a score of the human body information and the hand motion information corresponding to the selected teaching step of the medical-teaching guidance information, and the virtual-and-real display device 40 displays a change in operation of the virtual operation equipment in real time, and displays virtual-and-real integration of the human body information, the equipment motion information, and the physical space.

Figure 4A:
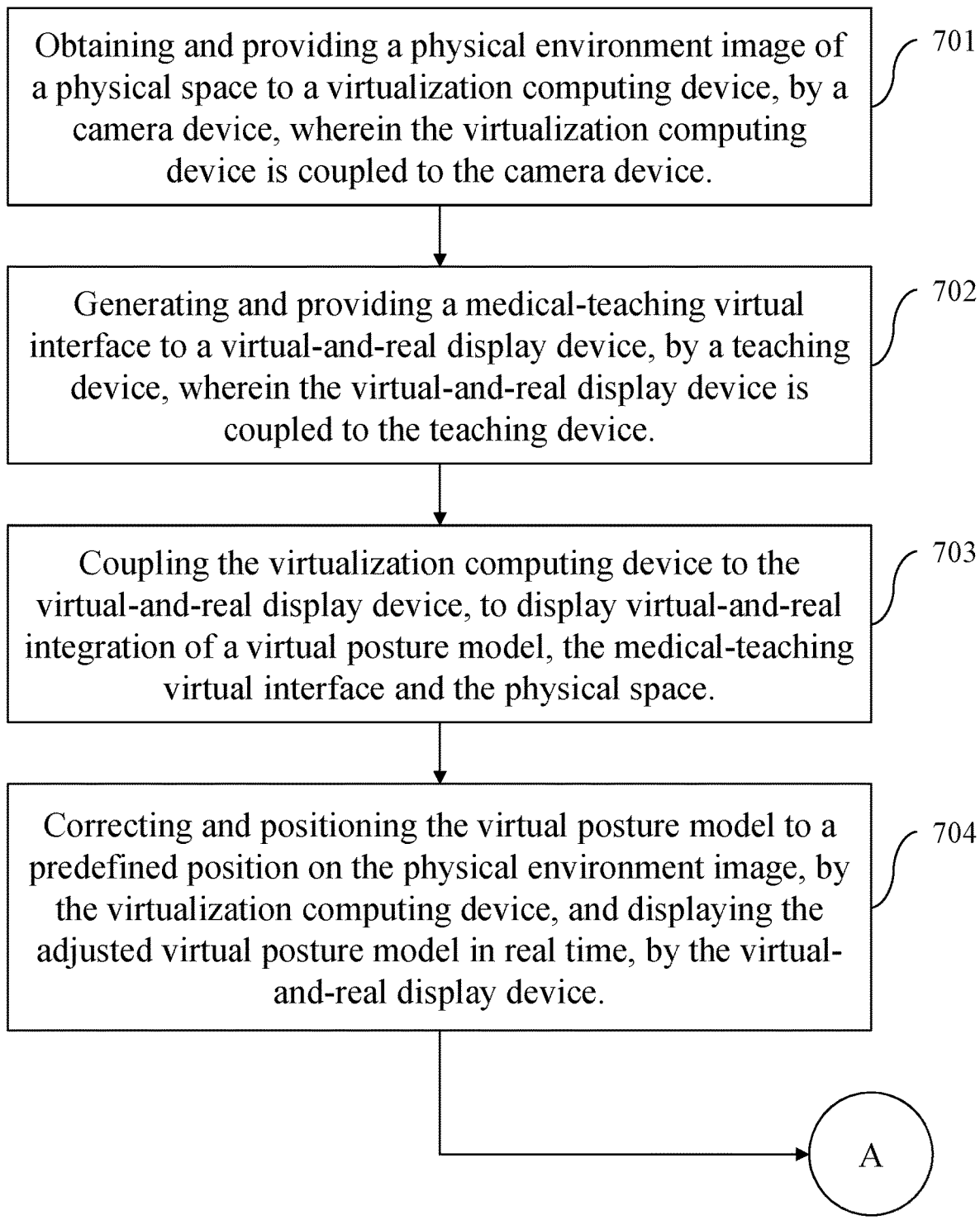
FIG. 4A to FIG. 4C are flowcharts of a first embodiment of a virtual and real integrated medical teaching assistance method based on mixed reality, according to the present invention.
Figure 4B:
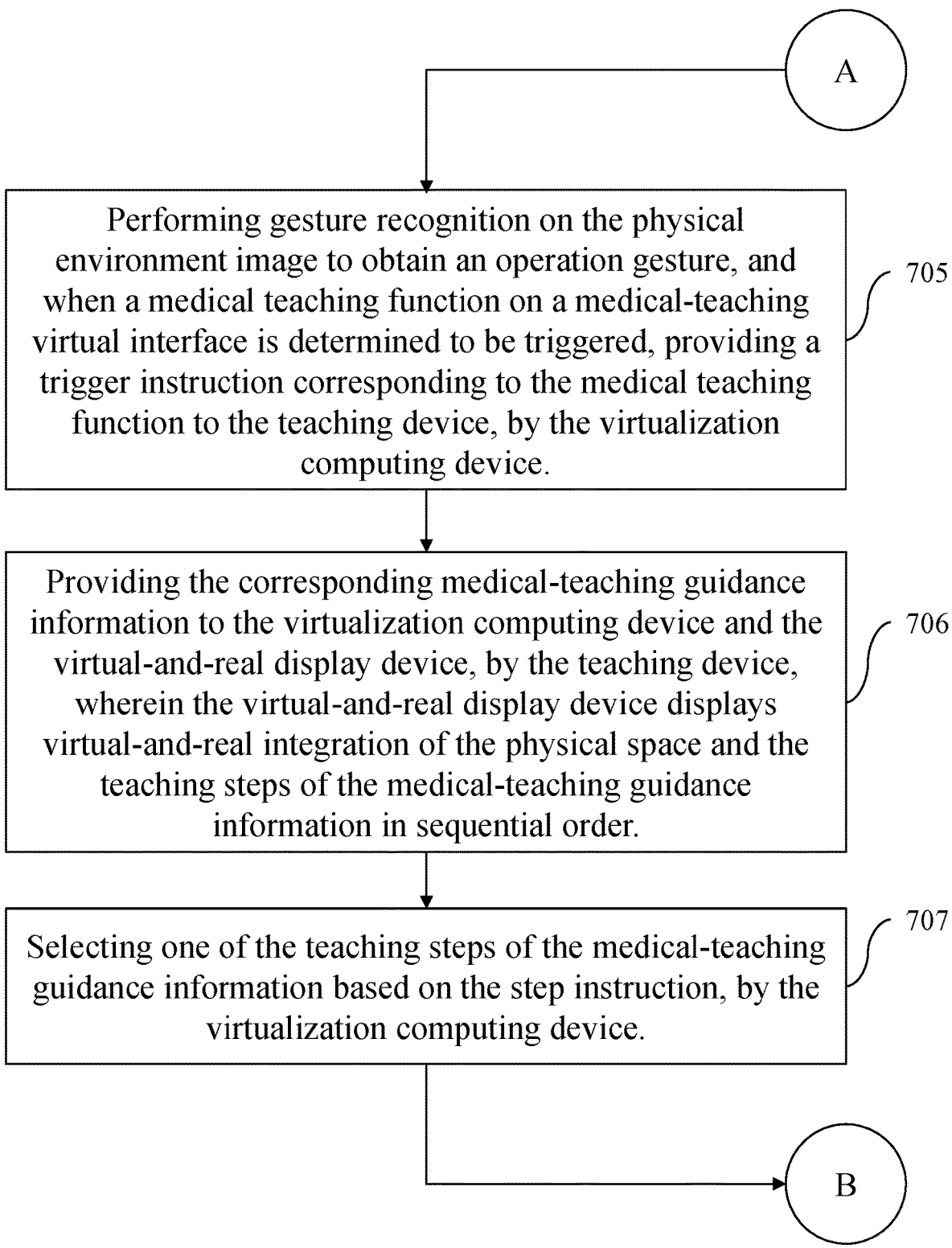
Figure 4C:
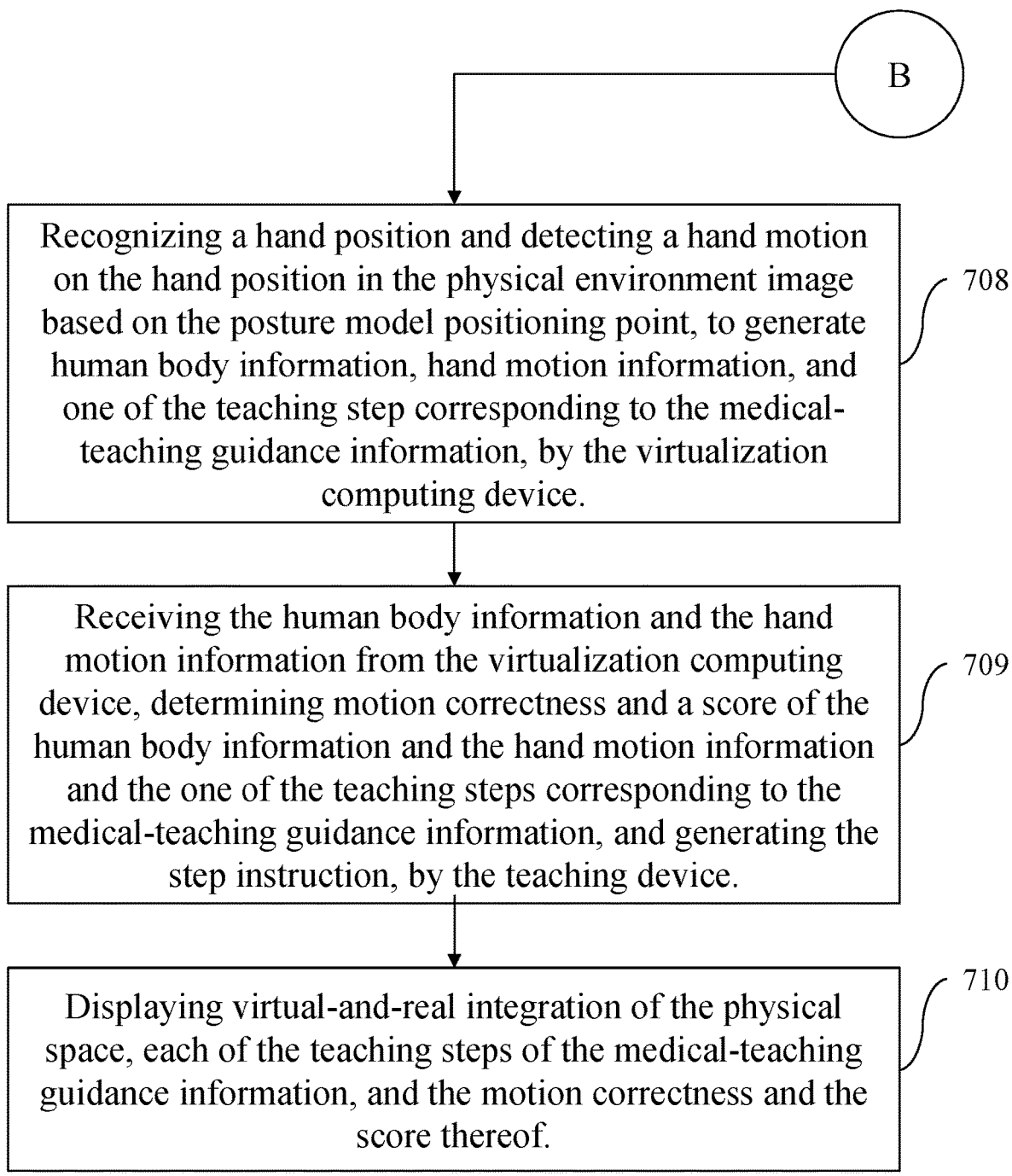

The operation method of the first embodiment of the present invention will be illustrated in the following paragraphs. Please refer to FIG. 4A to FIG. 4C. FIG. 4A to FIG. 4C are flowcharts of a first embodiment of a virtual and real integrated medical teaching assistance method based on mixed reality, according to the present invention.

As shown in FIG. 4A to FIG. 4C, the method includes the following steps of: obtaining and providing a physical environment image of a physical space to a virtualization computing device, by a camera device, wherein the virtualization computing device is coupled to the camera device (step 701); generating and providing a medical-teaching virtual interface to a virtual-and-real display device, by a teaching device, wherein the virtual-and-real display device is coupled to the teaching device (step 702); coupling the virtualization computing device to the virtual-and-real display device, to display virtual-and-real integration of a virtual posture model, the medical-teaching virtual interface and the physical space (step 703); correcting and positioning the virtual posture model to a predefined position on the physical environment image, by the virtualization computing device, and displaying the adjusted virtual posture model in real time, by the virtual-and-real display device (step 704); performing gesture recognition on the physical environment image to obtain an operation gesture, and when a medical teaching function on a medical-teaching virtual interface is determined to be triggered, providing a trigger instruction corresponding to the medical teaching function to the teaching device, by the virtualization computing device (step 705); providing the corresponding medical-teaching guidance information to the virtualization computing device and the virtual-and-real display device, by the teaching device, wherein the virtual-and-real display device displays virtual-and-real integration of the physical space and the teaching steps of the medical-teaching guidance information in sequential order (step 706); selecting one of the teaching steps of the medical-teaching guidance information based on the step instruction, by the virtualization computing device (step 707); recognizing a hand position and detecting a hand motion on the hand position in the physical environment image based on the posture model positioning point, to generate human body information, hand motion information, and one of the teaching step corresponding to the medical-teaching guidance information, by the virtualization computing device (step 708); receiving the human body information and the hand motion information from the virtualization computing device, determining motion correctness and a score of the human body information and the hand motion information and the one of the teaching steps corresponding to the medical-teaching guidance information, and generating the step instruction, by the teaching device (step 709); displaying virtual-and-real integration of the physical space, each of the teaching steps of the medical-teaching guidance information, and the motion correctness and the score thereof (step 710).

Figure 5:
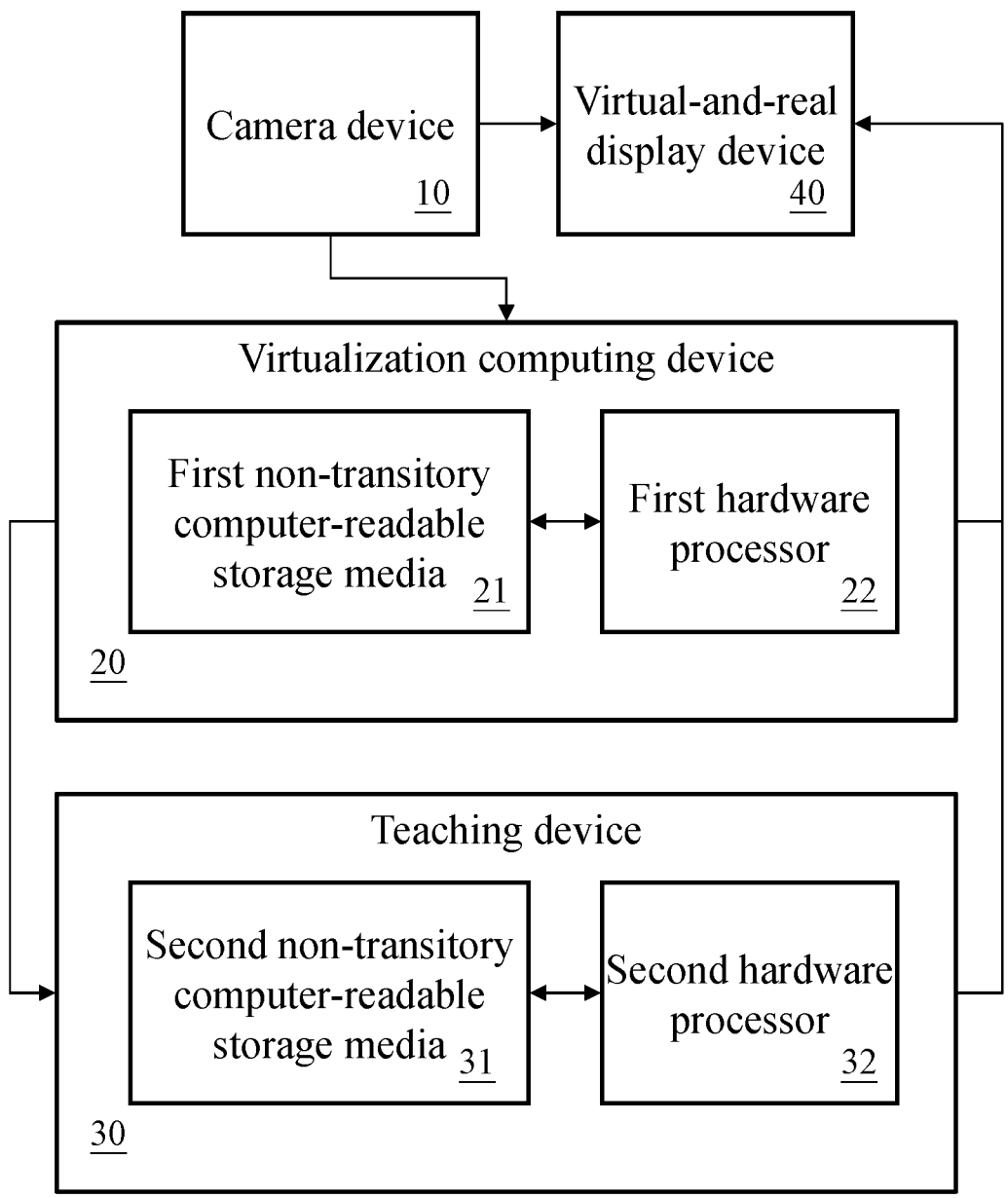
FIG. 5 is a system block diagram of a second embodiment of a virtual and real integrated medical teaching assistance system based on mixed reality, according to the present invention.

The virtual and real integrated medical teaching assistance system based on mixed reality of a second embodiment of a virtual and real integrated medical teaching assistance system based on mixed reality of the present invention will be illustrated in the following paragraphs. Please refer to FIG. 5. FIG. 5 is a system block diagram of a second embodiment of a virtual and real integrated medical teaching assistance system based on mixed reality, according to the present invention.

As shown in FIG. 5, the virtual and real integrated medical teaching assistance system based on mixed reality includes a camera device 10, a virtualization computing device 20, a teaching device 30, and a virtual-and-real display device 40, the virtualization computing device 20 includes a first non-transitory computer-readable storage medium 21 and a first hardware processor 22, the teaching device 30 includes a second non-transitory computer-readable storage medium 31 and a second hardware processor 32.

The camera device 10 obtains and provides a physical environment image of a physical space. The physical environment image includes a teach doll 80, the teach doll 80 has a sensor disposed at a particular position, and the virtualization computing device 20 is coupled to a camera device 10 and a teach doll 80.

The first non-transitory computer-readable storage medium 21 of the virtualization computing device 20 stores first computer readable instructions, the first hardware processor 22 of the virtualization computing device 20 is electrically connected to a first non-transitory computer-readable storage medium 21 of the virtualization computing device 20, the first hardware processor 22 of the virtualization computing device 20 executes the first computer readable instructions to make the virtualization computing device 20 execute: receiving the physical environment image from the camera device 10, correcting and positioning a virtual posture model to the position of the teach doll 80 in the physical environment image; performing gesture recognition on the physical environment image to obtain an operation gesture, and when a medical teaching function on a medical-teaching virtual interface is determined to be triggered, providing a trigger instruction corresponding to the medical teaching function; receiving medical-teaching guidance information or a step instruction to select one of the teaching steps of the medical-teaching guidance information; obtaining a sensing signal corresponding to the sensor from the teach doll, to recognize human body information and hand motion information corresponding to the selected one of the teaching steps of the medical-teaching guidance information, based on the sensing signal.

The teaching device 30 is coupled to the virtualization computing device 20. The second non-transitory computer-readable storage medium 31 is configured to store second computer readable instructions. The second hardware processor 32 is electrically connected to the second non-transitory computer-readable storage medium 31, and configured to execute the second computer readable instructions to make the teaching device 30 execute: generating and providing the medical-teaching virtual interface; receiving the trigger instruction from the virtualization computing device 20 to provide the medical-teaching guidance information corresponding to the trigger instruction; receiving the human body information and the hand motion information from the virtualization computing device 20, determining motion correctness and a score of the human body information and the hand motion information corresponding to the selected on of the teaching steps of the medical-teaching guidance information, to generate the step instruction.

Figure 6:
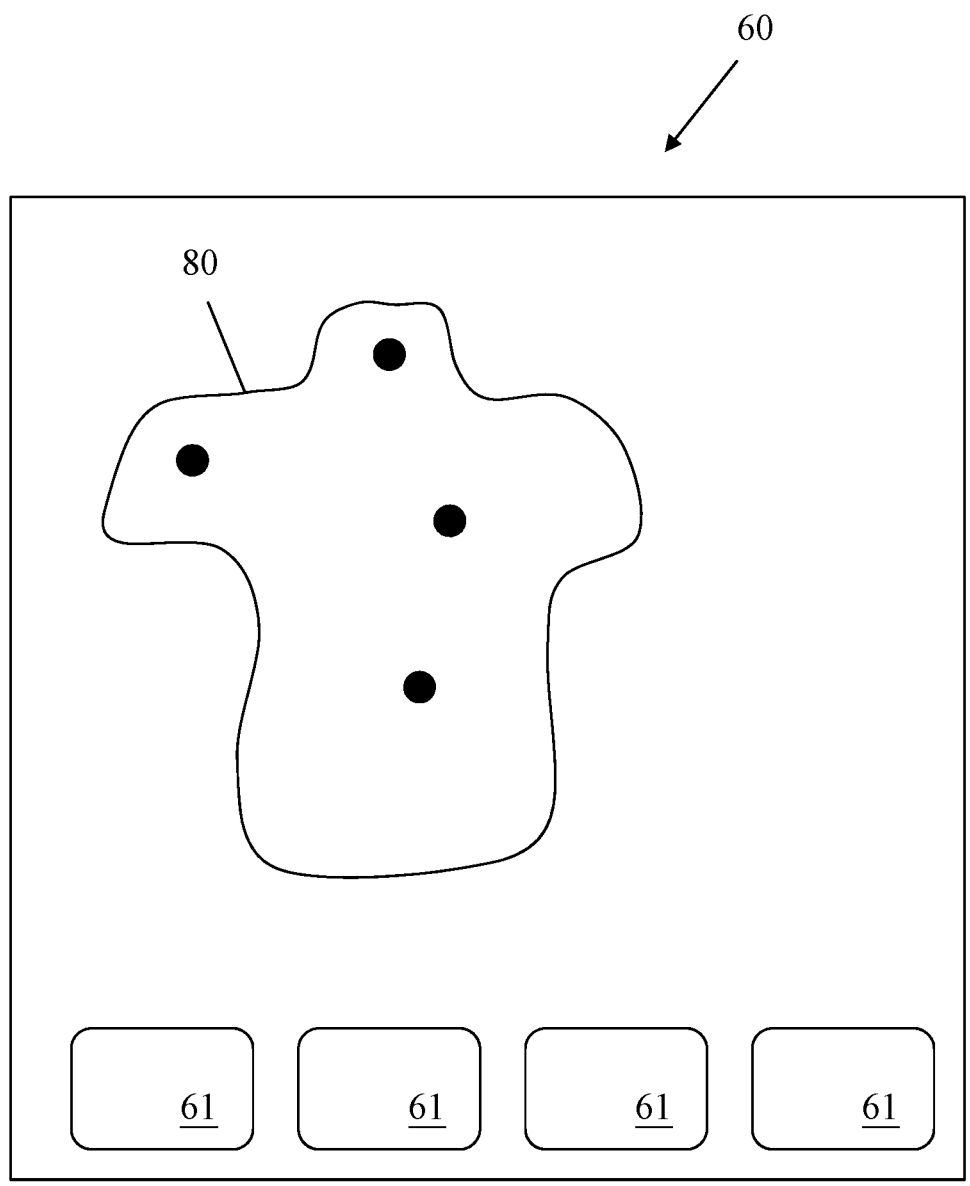
FIG. 6 is a schematic view of virtual-and-real integration of the second embodiment of a virtual and real integrated medical teaching assistance system based on mixed reality, according to the present invention.

The virtual-and-real display device 40 is coupled to the virtualization computing device 20 and the teaching device 30, the teaching device 30 generates and provides a medical-teaching virtual interface 60 to the virtual-and-real display device 40, and the virtual-and-real display device 40 displays virtual-and-real integration of the virtual posture model, the medical-teaching virtual interface60, the teach doll 80 and the physical space, as shown in FIG. 6. FIG. 6 is a schematic view of virtual-and-real integration of the second embodiment of a virtual and real integrated medical teaching assistance system based on mixed reality, according to the present invention.

The virtualization computing device 20 receives the physical environment image from the camera device 10, corrects and positions a virtual posture model 50 to the position of the teach doll 80 in the physical environment image, and the virtualization computing device 20 can generate a virtual posture model having posture model aligning points, based on a preset size.

The virtual-and-real display device 40 is configured to display virtual-and-real integration of the virtual posture model, the teach doll 80 and the physical space. The virtual-and-real display device 40 can adopt the naked vision 3D technology to display virtual-and-real integration of the virtual posture model, the teach doll 80 and the physical space. In an embodiment, the virtual-and-real display device 40 can adopt a mixed reality device, which has transparent waveguides to couple light input grating and/or output grating, to display virtual-and-real integration of the virtual posture model, the teach doll 80 and the physical space. However, these examples are merely for exemplary illustration, and the application field of the present invention is not limited to these examples.

When an operator operates the virtual posture model by a gesture thereof, the physical environment image obtained and provided by the camera device 10 includes an operating gesture, the virtualization computing device 20 performs gesture recognition on the physical environment image to obtain an adjustment gesture for scaling, moving, or 3D rotating the virtual posture model 50. The virtual posture model adjusted by the scaling, moving, or 3D rotating operation is displayed by the virtual-and-real display device 40 in real time.

The operator uses the adjustment gesture to scale, move, or 3D rotate the virtual posture model, to make the posture model aligning points of the virtual posture model correspond and align to the posture model positioning points of the teach doll 80 one by one. The virtualization computing device 20 performs gesture recognition on the physical environment image to obtain a position-fixing gesture for fixing the virtual posture model to a position of the teach doll 80.

The virtualization computing device 20 can correspond the posture model aligning points of the virtual posture model to the posture model positioning points of the teach doll 80 one by one, and the virtualization computing device 20 automatically corrects to calculate an adjustment instruction for scaling, moving, or 3D rotating the virtual posture model 40, to automatically correct and align the virtual posture model to the position of the teach doll 80 in the physical environment image.

The virtualization computing device 20 performs gesture recognition on the physical environment image to obtain an operation gesture. When determining that a medical teaching function on a medical-teaching virtual interface 60 is triggered, the virtualization computing device 20 provides a trigger instruction corresponding to the medical teaching function to the teaching device 30. It should be noted that the virtualization computing device 20 recognizes a hand position in the physical environment image and the recognized hand position is used as a function position 61 on the medical-teaching virtual interface 60, and when the operation gesture is a single-hand gesture for clicking the function position 61, the virtualization computing device 20 determines that the medical teaching function corresponding to the function position 61 on the medical-teaching virtual interface is triggered, so that the virtualization computing device 20 provides the trigger instruction corresponding to the medical teaching function to the teaching device 30.

Figure 7A:
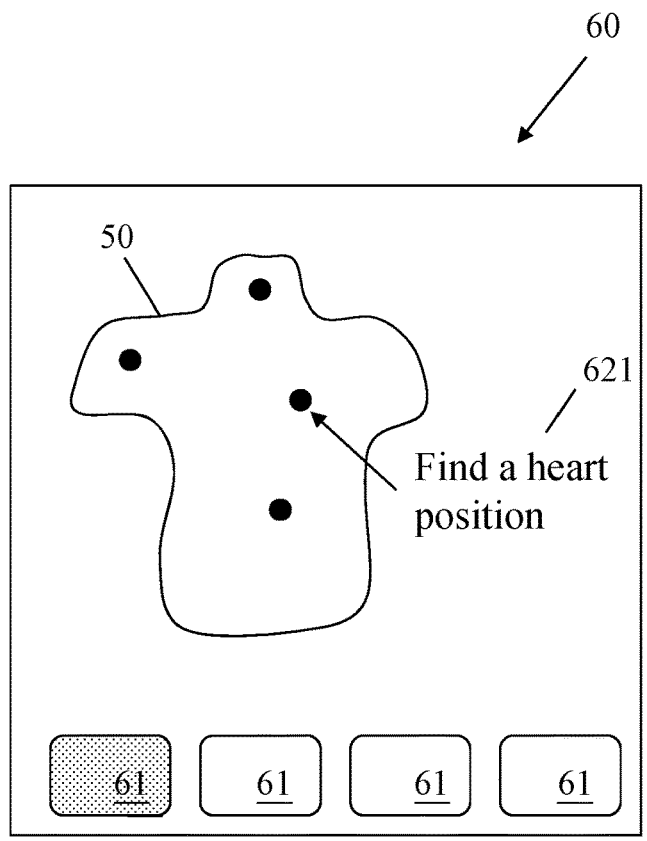
FIG. 7A is a schematic view of medical-teaching guidance information of the second embodiment of a virtual and real integrated medical teaching assistance system based on mixed reality, according to the present invention.

When the teaching device 30 receives the trigger instruction from the virtualization computing device 20, the teaching device 30 provides the medical-teaching guidance information corresponding to the trigger instruction, the virtual-and-real display device 40 displays virtual-and-real integration of the physical space and each of teaching steps of the medical-teaching guidance information in sequential order. Please refer to FIG. 7A. FIG. 7A is a schematic view of a first teaching step 621 of the medical-teaching guidance information of the second embodiment, according to the present invention, but the present invention is not limited to above-mentioned examples.

When the virtualization computing device 20 receives the medical-teaching guidance information from the teaching device 30, the virtualization computing device 20 selects the first teaching step of the medical-teaching guidance information, the virtualization computing device 20 receives the sensing signal corresponding to the sensor from the teach doll 80, and recognizes the human body information and had motion information corresponding to the teaching, and looks up the hand motion information corresponding to the sensing signal of the sensor through a lookup table. Particularly, based on a lookup table, the hand motion information corresponding to a sensing signal (such as a different pressure value) of a different sensor can be "vertical press with both hands" or "non-vertical press with both hands"; however, these examples are merely for exemplary illustration, and the application field of the present invention is not limited to these examples.

The teaching device 30 receives the human body information and the hand motion information from the virtualization computing device 20, and determines motion correctness and a score of the human body information and the hand motion information corresponding to the selected on of the teaching steps of the medical-teaching guidance information, to generate the step instruction.

Figure 7B:
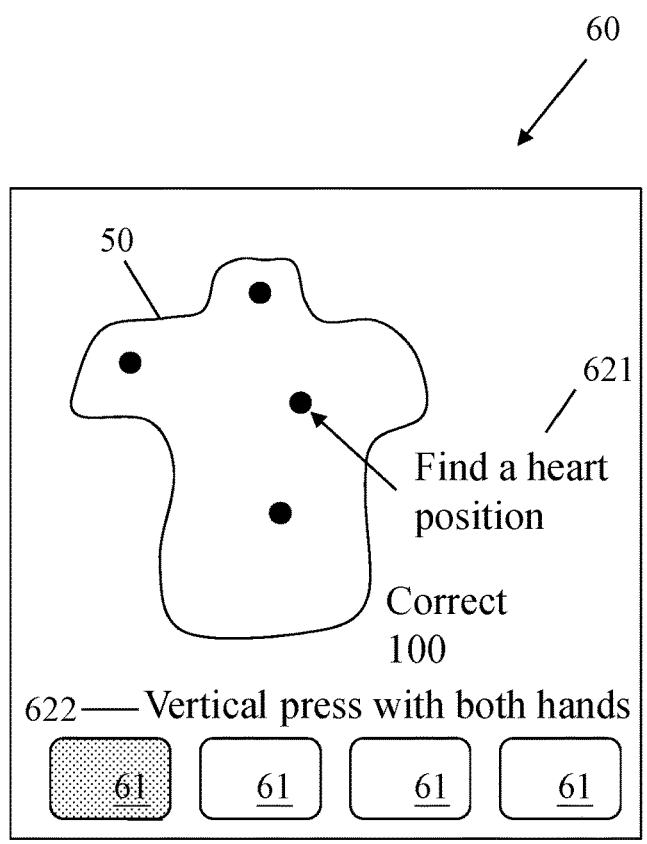
FIG. 7B is a schematic view of medical correctness and score of the second embodiment of a virtual and real integrated medical teaching assistance system based on mixed reality, according to the present invention.

The virtual-and-real display device 40 displays virtual-and-real integration of the physical space, each of the teaching steps of the medical-teaching guidance information, and the motion correctness and score thereof, as shown in FIG. 7B. FIG. 7B is a schematic view of medical correctness and score of the second embodiment of a virtual and real integrated medical teaching assistance system based on mixed reality, according to the present invention. FIG. 7B shows medical correctness and scores corresponding to the second teaching step 622 and the first teaching step 621 of the medical-teaching guidance information, but the application field of the present invention is not limited to these examples. It should be noted that after the teaching device 30 determines the correctness and the score of the human body information and the hand motion information corresponding to the teaching step of the medical-teaching guidance information, the virtual-and-real display device 40 can display virtual-and-real integration of the physical space, the teaching step of the medical-teaching guidance information, and the motion correctness and score thereof. In an embodiment, the virtual-and-real display device 40 can display virtual-and-real integration of the physical space, each of the teaching steps of the medical-teaching guidance information, and the motion correctness and score thereof in a sequence order after the teaching device 30 determines the correctness and the score of the human body information and the hand motion information corresponding to all of the teaching steps of the medical-teaching guidance information.

A physical operation equipment can be disposed in the physical space; when the camera device 10 obtains and provides the physical environment image of the physical space, the physical environment image contains the physical operation equipment. The physical operation equipment includes an equipment identification point and an equipment sensor, the virtualization computing device 20 is coupled to the operation equipment through a wired transmission manner or a wireless transmission manner, the virtualization computing device 20 obtains an equipment sensing signal from an equipment sensor, and the virtualization computing device 20 recognizes a position of the equipment identification point based on the posture model positioning points, and recognizes equipment motion information based on the equipment sensing signal. The virtualization computing device 20 looks up the equipment motion information corresponding to the equipment sensing signal from a lookup table; the equipment motion information can be, for example, cutting and pasting, or inserting operation. However, these examples are merely for exemplary illustration, and the application field of the present invention is not limited to these examples. The teaching device 30 receives the human body information and the equipment motion information from the virtualization computing device 20, and determines motion correctness and a score of the human body information and the hand motion information corresponding to the teaching step of the medical-teaching guidance information, and the virtual-and-real display device 40 displays a change in operation of the virtual operation equipment in real time, and display virtual-and-real integration of the human body information, the equipment motion information, and the physical space.

The virtualization computing device 20 can generate a virtual operation equipment in the physical environment image, the virtual operation equipment has an equipment identification point, and the virtualization computing device 20 performs gesture recognition on the physical environment image to obtain an equipment selection gesture for operating the virtual operation equipment; the equipment selection gesture includes single-hand operation gesture (such as selecting the virtual operation equipment by one hand); however, these examples are merely for exemplary illustration, and the application field of the present invention is not limited to these examples. The virtualization computing device 20 performs position and motion recognition on the equipment identification point based on the posture model positioning points, to generate the human body information and equipment motion information. The teaching device 30 receives the human body information and the equipment motion information from the virtualization computing device 20, and determines the correctness and the score of the human body information and the equipment motion information corresponding to the teaching step of the medical-teaching guidance information. The virtual-and-real display device 40 displays a change in the operation of the virtual operation equipment in real time, and also displays virtual-and-real integration of the human body information, the equipment motion information, and the physical space.

The equipment motion recognition performed by the virtualization computing device 20 is based on an equipment motion model constructed by machine learning, to recognize the corresponding hand motion and equipment operation. The illustration of equipment motion model can refer to that of the gesture model, so the detailed description is not repeated herein. The illustration of the machine learning can refer to that of above-mentioned machine learning, so the detailed description is mot repeated herein.

Figure 8B:
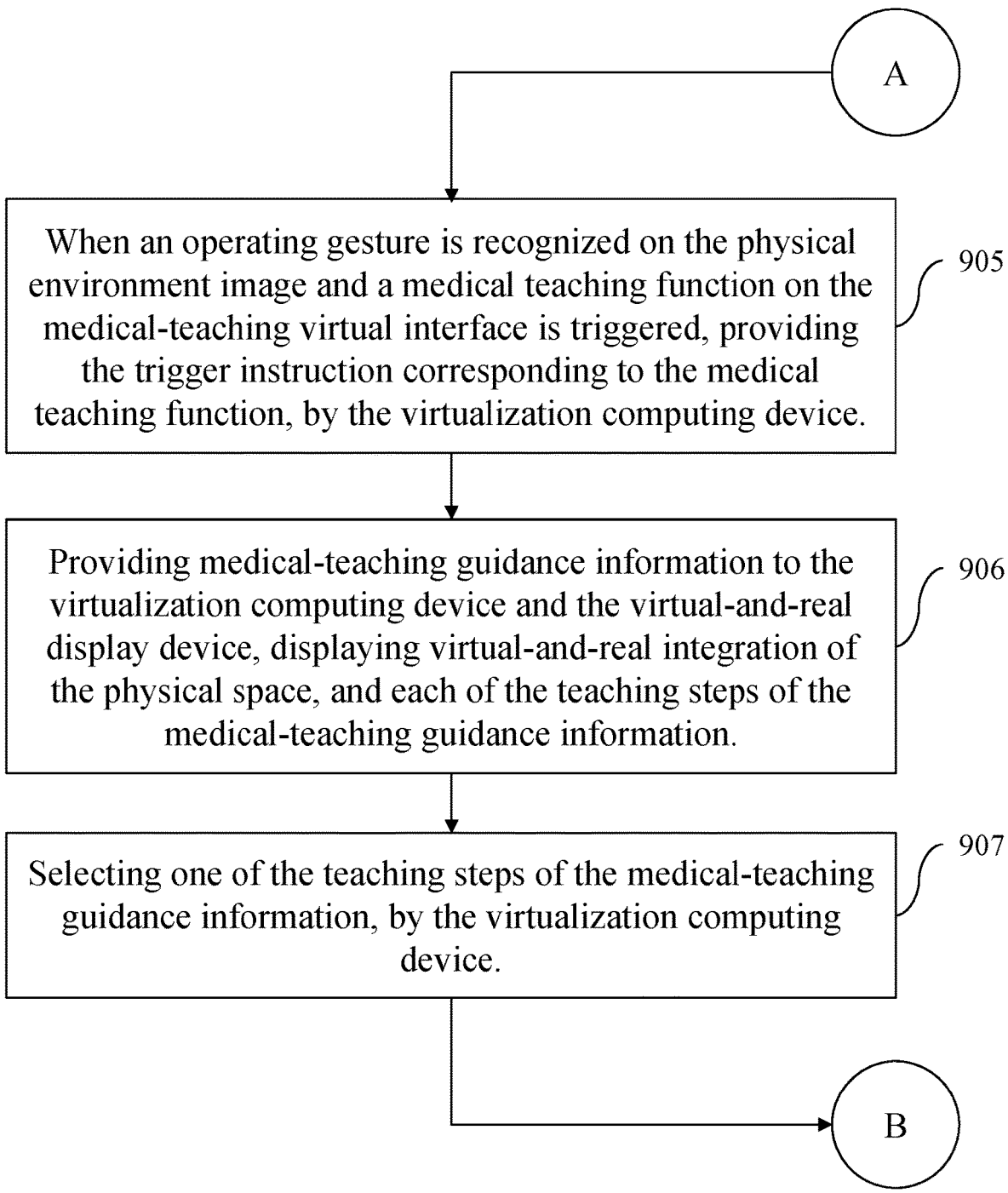
Figure 8C:
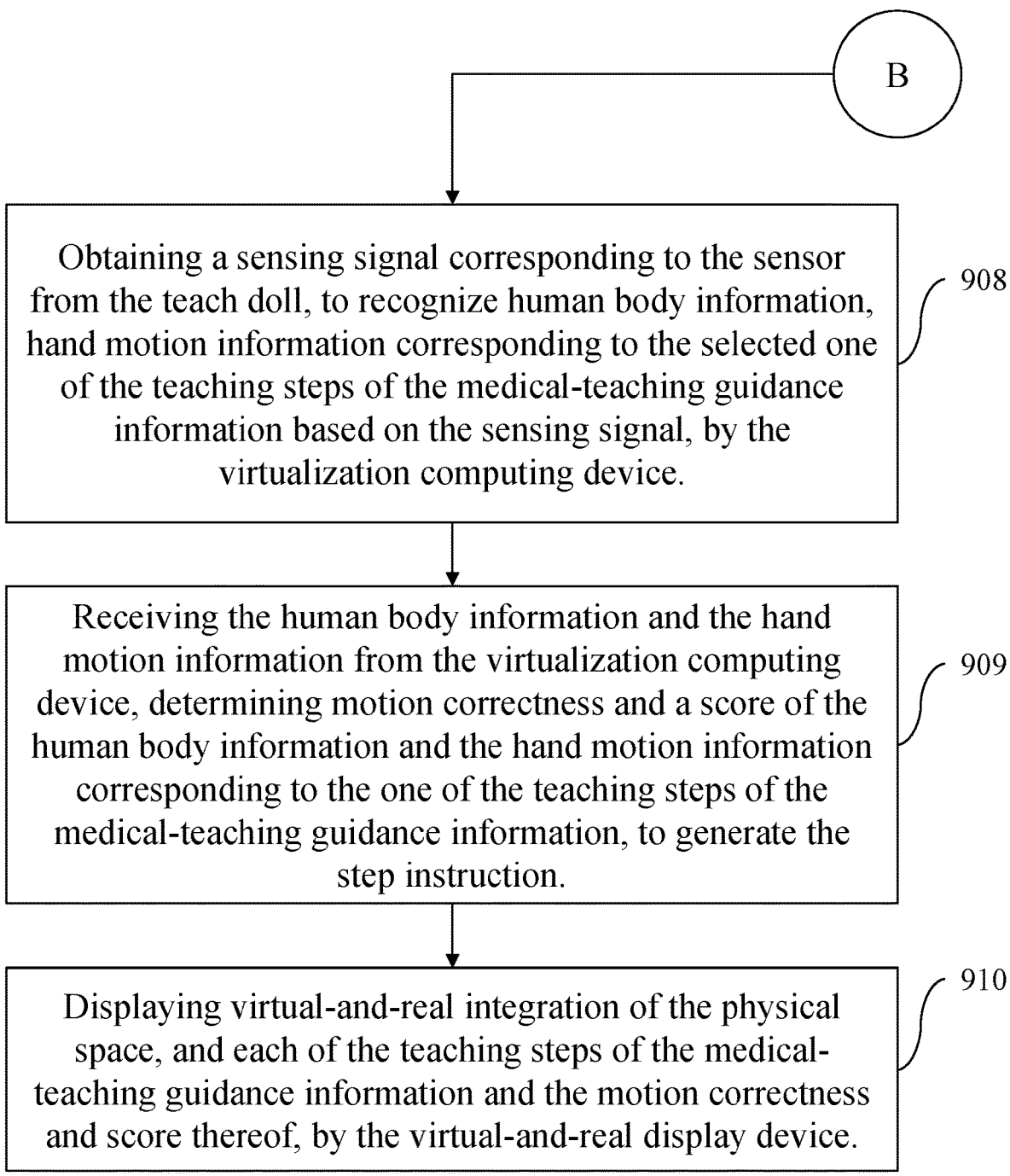

The operation method of the second embodiment of the present invention will be illustrated in the following paragraphs. Please refer to FIG. 8A to FIG. 8C. FIG. 8A to FIG. 8C are flowcharts of a second embodiment of a virtual and real integrated medical teaching assistance method based on mixed reality, according to the present invention.

As shown in FIG. 8A to FIG. 8C, the method includes the following steps of: obtaining and providing a physical environment image of a physical space, by a camera device, wherein the physical environment image comprises a teach doll, and the teach doll has a sensor disposed at a particular position (step 901); generating and providing the medical-teaching virtual interface to a virtual-and-real display device, by a teaching device, wherein the virtual-and-real display device is coupled to the teaching device (step 902); coupling a virtualization computing device to the virtual-and-real display device, to display virtual-and-real integration of the virtual posture model, the medical-teaching virtual interface, the teach doll and the physical space (step 903); correcting and positioning a virtual posture model to a position of the teach doll in the physical environment image, by the virtualization computing device, and display a change in adjustment of the virtual posture model in real time, by the virtual-and-real display device (step 904); when an operating gesture is recognized on the physical environment image and a medical teaching function on the medical-teaching virtual interface is triggered, providing the trigger instruction corresponding to the medical teaching function, by the virtualization computing device (step 905); providing medical-teaching guidance information to the virtualization computing device and the virtual-and-real display device, displaying virtual-and-real integration of the physical space, and each of the teaching steps of the medical-teaching guidance information (step 906); selecting one of the teaching steps of the medical-teaching guidance information, by the virtualization computing device (step 907); obtaining a sensing signal corresponding to the sensor from the teach doll, to recognize human body information, hand motion information corresponding to the selected one of the teaching steps of the medical-teaching guidance information based on the sensing signal, by the virtualization computing device (step 908); receiving the human body information and the hand motion information from the virtualization computing device, determining motion correctness and a score of the human body information and the hand motion information corresponding to the one of the teaching steps of the medical-teaching guidance information, to generate the step instruction (step 909); displaying virtual-and-real integration of the physical space, and each of the teaching steps of the medical-teaching guidance information and the motion correctness and score thereof, by the virtual-and-real display device (step 910).

According to the above-mentioned systems and methods of the present invention, the virtualization computing device corrects and positions the virtual posture model to the predefined position on the physical environment image, recognizes an operation gesture from the physical environment image to trigger the medical teaching function to obtain the medical-teaching guidance information from the teaching device, the virtual-and-real display device displays virtual-and-real integration of each of the teaching steps of the medical-teaching guidance information, the virtualization computing device recognizes the hand position and detects the hand motion on the hand position on the physical environment image based on posture model positioning points, to generate and provide the human body information and the hand motion information to the teaching device, the teaching device determines the motion correctness and the score of the human body information and the hand motion information corresponding to the teaching step of the medical-teaching guidance information.

Therefore, the above-mentioned technical solution of the present invention is able to solve the conventional problem of bad learning effect due to failure to provide enough physical objects for assisting teaching subject to teaching cost considerations, to achieve the technical effect of providing virtual and real integrated medical teaching assistance based on mixed reality.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A virtual and real integrated medical teaching assistance system based on mixed reality, comprising:
    a camera device, configured to obtain and provide a physical environment image of a physical space;
    a virtualization computing device, coupled to the camera device, wherein the virtualization computing device comprises:
        a first non-transitory computer-readable storage medium, configured to store first computer readable instructions; and
        a first hardware processor, electrically connected to the first non-transitory computer-readable storage medium, and configured to execute the first computer readable instructions to make the virtualization computing device execute:
            receiving the physical environment image from the camera device, and correcting and positioning a virtual posture model to a predefined position on the physical environment image;

performing gesture recognition on the physical environment image to obtain an operation gesture, and when a medical teaching function on a medical-teaching virtual interface is determined to be triggered, providing a trigger instruction corresponding to the medical teaching function;

receiving medical-teaching guidance information or a step instruction to select one of teaching steps of the medical-teaching guidance information; and recognizing a hand position and detecting a hand motion on the hand position on the physical environment image based on the posture model positioning points, to generate human body information and hand motion information corresponding to the selected one of the teaching steps of the medical-teaching guidance information;

a teaching device, coupled to the virtualization computing device, wherein the teaching device comprises:

a second non-transitory computer-readable storage medium, configured to store second computer readable instructions; and a second hardware processor, electrically connected to the second non-transitory computer-readable storage medium, and configured to execute the second computer readable instructions to make the teaching device execute:

generating and providing the medical-teaching virtual interface;

receiving the trigger instruction from the virtualization computing device, and providing the medical-teaching guidance information corresponding to the trigger instruction; and receiving the human body information and the hand motion information from the virtualization computing device, determining motion correctness and a score of the human body information and the hand motion information corresponding to the selected one of the teaching steps of the medical-teaching guidance information, to generate the step instruction; and a virtual-and-real display device, coupled to the virtualization computing device and the teaching device, and configured to display virtual-and-real integration of the posture model positioning points, the virtual posture model, the medical-teaching virtual interface, and the physical space, display a change in adjustment of the virtual posture model in real time, display virtual-and-real integration of the physical space and the teaching steps of the medical-teaching guidance information in sequential order, and display virtual-and-real integration of the physical space, each of the teaching steps of the medical-teaching guidance information and the motion correctness and the score thereof.

2. The virtual and real integrated medical teaching assistance system based on mixed reality according to claim 1, wherein the virtualization computing device executes:

generating a virtual medical equipment in the physical environment image, wherein the virtual medical equipment has an equipment identification point;

performing gesture recognition on the physical environment image to obtain an equipment selection gesture for operating the virtual medical equipment; and performing position and motion recognition on the equipment identification point based on the posture model positioning points, to generate the human body information and the equipment motion information;

wherein the teaching device executes:

receiving the human body information and the equipment motion information from the virtualization computing device, determining the motion correctness and the score of the human body information and the equipment motion information corresponding to the selected one of the teaching steps of the medical-teaching guidance information, to generate the step instruction; and wherein the virtual-and-real display device displays the operated virtual medical equipment in real time, display virtual-and-real integration of the human body information, the equipment motion information and the physical space, display virtual-and-real integration of the physical space, and each of the teaching steps of the medical-teaching guidance information and the motion correctness and the score thereof.

3. The virtual and real integrated medical teaching assistance system based on mixed reality according to claim 1, wherein the physical environment image comprises a medical equipment, and the medical equipment has an equipment identification point and an equipment sensor, the virtualization computing device is coupled to the medical equipment and configured to execute:

obtaining an equipment sensing signal from the equipment sensor;

recognizing a position of the equipment identification point based on the posture model positioning points, and recognizing equipment motion information based on the equipment sensing signal;

wherein the teaching device executes:

receiving the human body information and the equipment motion information from the virtualization computing device, and determining motion correctness and a score of the human body information and the equipment motion information, and the corresponding teaching step of the medical-teaching guidance information, to generate the step instruction; and wherein the virtual-and-real display device displays the operated medical equipment in real time, display virtual-and-real integration of the human body information, the equipment motion information, the teach doll and the physical space, and displays virtual-and-real integration of the physical space, and each of the teaching steps of the medical-teaching guidance information and the motion correctness and the score thereof.

4. A virtual and real integrated medical teaching assistance method based on mixed reality, comprising:

obtaining and providing a physical environment image of a physical space to a virtualization computing device, by a camera device, wherein the virtualization computing device is coupled to the camera device;

generating and providing a medical-teaching virtual interface to a virtual-and-real display device, by a teaching device, wherein the virtual-and-real display device is coupled to the teaching device;

displaying virtual-and-real integration of a virtual posture model, the medical-teaching virtual interface and the physical space, by the virtualization computing device and the virtual-and-real display device, wherein the virtualization computing device is coupled to the virtual-and-real display device;

correcting and positioning the virtual posture model to a predefined position on the physical environment image, by the virtualization computing device, and displaying the adjusted virtual posture model in real time, by the virtual-and-real display device;

performing gesture recognition on the physical environment image to obtain an operation gesture, and when a medical teaching function on a medical-teaching virtual interface is determined to be triggered, providing a trigger instruction corresponding to the medical teaching function to the teaching device, by the virtualization computing device;

providing the corresponding medical-teaching guidance information to the virtualization computing device and the virtual-and-real display device, by the teaching device, wherein the virtual-and-real display device displays virtual-and-real integration of the physical space and the teaching steps of the medical-teaching guidance information in sequential order;

selecting one of the teaching steps of the medical-teaching guidance information based on the step instruction, by the virtualization computing device;

recognizing a hand position and detecting a hand motion on the hand position in the physical environment image based on the posture model positioning point, to generate human body information, hand motion information, and one of the teaching step corresponding to the medical-teaching guidance information, by the virtualization computing device;

receiving the human body information and the hand motion information from the virtualization computing device, determining motion correctness and a score of the human body information and the hand motion information corresponding to the selected one of the teaching steps of the medical-teaching guidance information, and generating the step instruction, by the teaching device; and displaying virtual-and-real integration of the physical space, and each of the teaching steps of the medical-teaching guidance information and the motion correctness and the score thereof.

5. The virtual and real integrated medical teaching assistance method based on mixed reality according to claim 4, wherein comprising:

generating a virtual medical equipment in the physical environment image, wherein the virtual medical equipment has an equipment identification point, by the virtualization computing device;

performing gesture recognition on the physical environment image to obtain an equipment selection gesture for operating the virtual medical equipment, by the virtualization computing device;

performing position and motion recognition on the equipment identification point based on the posture model positioning points, to generate the human body information and the equipment motion information, by the virtualization computing device;

receiving the human body information and the equipment motion information from the virtualization computing device, determining the motion correctness and the score of the human body information and the equipment motion information corresponding to the selected one of the teaching steps of the medical-teaching guidance information, to generate the step instruction, by the teaching device;

displaying the operated virtual medical equipment in real time, displaying virtual-and-real integration of the human body information, the equipment motion information and the physical space, displaying virtual-and-real integration of the physical space, and each of the teaching steps of the medical-teaching guidance information and the motion correctness and the score thereof, by the virtual-and-real display device.

6. The virtual and real integrated medical teaching assistance method based on mixed reality according to claim 4, wherein the physical environment image comprises a medical equipment, and the medical equipment has an equipment identification point and an equipment sensor, and the virtual and real integrated medical teaching assistance method further comprising:

coupling the virtualization computing device to the medical equipment, to receive an equipment sensing signal from the equipment sensor;

recognizing a position of the equipment identification point based on the posture model positioning points, and recognizing equipment motion information based on the equipment sensing signal, by the virtualization computing device;

receiving the human body information and the equipment motion information from the virtualization computing device, and determining motion correctness and a score of the human body information and the equipment motion information, and the corresponding teaching step of the medical-teaching guidance information, to generate the step instruction, by the teaching device;

displaying the operated medical equipment in real time, displaying virtual-and-real integration of the human body information, the equipment motion information, the teach doll and the physical space, and displaying virtual-and-real integration of the physical space, and each of the teaching steps of the medical-teaching guidance information and the motion correctness and the score thereof, by the virtual-and-real display device.

7. A virtual and real integrated medical teaching assistance system based on mixed reality, comprising:

a camera device, configured to obtain and provide a physical environment image of a physical space, wherein the physical environment image comprises a teach doll, and the teach doll comprises a sensor disposed at a particular position;

a virtualization computing device, coupled to the camera device and the teach doll, wherein the virtualization computing device comprises:

a first non-transitory computer-readable storage medium, configured to store first computer readable instructions; and a first hardware processor, electrically connected to the first non-transitory computer-readable storage medium, and configured to execute the first computer readable instructions to make the virtualization computing device execute:

receiving the physical environment image from the camera device, and correcting and positioning a virtual posture model to a position of the teach doll in the physical environment image;

performing gesture recognition on the physical environment image to obtain an operation gesture, and when a medical teaching function on a medical-teaching virtual interface is determined to be triggered, providing a trigger instruction corresponding to the medical teaching function;

receiving medical-teaching guidance information or a step instruction to select one of the teaching steps of the medical-teaching guidance information; and obtaining a sensing signal corresponding to the sensor from the teach doll, to recognize human body information, hand motion information and one of the teaching steps of the medical-teaching guidance information based on the sensing signal;
a teaching device, coupled to the virtualization computing device, wherein the teaching device comprises:
a second non-transitory computer-readable storage medium, configured to store second computer readable instructions; and
a second hardware processor, electrically connected to the second non-transitory computer-readable storage medium, and configured to execute the second computer readable instructions to make the teaching device execute:
generating and providing the medical-teaching virtual interface;
receiving the trigger instruction from the virtualization computing device to provide the medical-teaching guidance information corresponding to the trigger instruction; and
receiving the human body information and the hand motion information from the virtualization computing device, determining motion correctness and a score of the human body information and the hand motion information corresponding to the one of the teaching steps of the medical-teaching guidance information, to generate the step instruction; and
a virtual-and-real display device, coupled to the virtualization computing device and the teaching device, and configured to display virtual-and-real integration of the posture model positioning points, the virtual posture model, the medical-teaching virtual interface, the teach doll and the physical space, display a change in adjustment of the virtual posture model in real time, display virtual-and-real integration of the physical space and the teaching steps of the medical-teaching guidance information in sequential order, and display virtual-and-real integration of the physical space, and each of the teaching steps of the medical-teaching guidance information and the motion correctness and score thereof.

8. The virtual and real integrated medical teaching assistance system based on mixed reality according to claim 7, wherein the physical environment image comprises a medical equipment, and the medical equipment has an equipment identification point and an equipment sensor,
the virtualization computing device is coupled to the medical equipment and configured to execute:
obtaining an equipment sensing signal from the equipment sensor;
recognizing a position of the equipment identification point based on the posture model positioning points, and recognizing equipment motion information based on the equipment sensing signal;
wherein the teaching device executes:
receiving the human body information and the equipment motion information from the virtualization computing device, and determining motion correctness and a score of the human body information and the equipment motion information, and the corresponding teaching step of the medical-teaching guidance information, to generate the step instruction; and
wherein the virtual-and-real display device displays the operated medical equipment in real time, display virtual-and-real integration of the human body information, the equipment motion information, the teach doll and the physical space, and displays virtual-and-real integration of the physical space, and each of the teaching steps of the medical-teaching guidance information and the motion correctness and the score thereof.

9. The virtual and real integrated medical teaching assistance system based on mixed reality according to claim 7, wherein the virtualization computing device executes:
generating a virtual medical equipment in the physical environment image, wherein the virtual medical equipment has an equipment identification point;
performing gesture recognition on the physical environment image to obtain an equipment selection gesture for operating the virtual medical equipment; and
performing position and motion recognition on the equipment identification point based on the posture model positioning points, to generate the human body information and the equipment motion information;
wherein the teaching device executes:
receiving the human body information and the equipment motion information from the virtualization computing device, determining the motion correctness and the score of the human body information and the equipment motion information corresponding to the selected one of the teaching steps of the medical-teaching guidance information, to generate the step instruction; and
wherein the virtual-and-real display device displays the operated virtual medical equipment in real time, display virtual-and-real integration of the human body information, the equipment motion information and the physical space, display virtual-and-real integration of the physical space, and each of the teaching steps of the medical-teaching guidance information and the motion correctness and the score thereof.

* * * * *